United States Patent [19]

Houtz et al.

[11] 4,447,106

[45] May 8, 1984

[54] PANEL MOUNTED MODULAR JACK

[75] Inventors: Timothy W. Houtz, Tower City; Paul R. Jagen, Mechanicsburg, both of Pa.

[73] Assignee: E. I. Du Pont de Nemours and Company, Wilmington, Del.

[21] Appl. No.: 325,023

[22] Filed: Nov. 25, 1981

[51] Int. Cl.[3] .............................................. H02B 1/02

[52] U.S. Cl. ................................ 339/126 R; 248/27.3; 339/176 M

[58] Field of Search .............. 339/126 R, 129, 176 M; 248/27.1, 27.3, 205.3

[56] References Cited

U.S. PATENT DOCUMENTS 2,317,162 4/1943 Wood ............................ 248/27.3 X
3,164,873 1/1965 March ................................ 248/27.3

FOREIGN PATENT DOCUMENTS 1549834 11/1968 France ............................... 248/27.3
479177 11/1969 Switzerland ....................... 248/27.3
541306 11/1941 United Kingdom ................ 339/129
941628 11/1963 United Kingdom ................ 339/126
1360195 7/1974 United Kingdom .............. 248/27.3

*Primary Examiner*—Eugene F. Desmond

[57] ABSTRACT

A modular jack suitable for mounting in a punched hole in a panel board. The jack has a rear end that fits into the hole and a front face that does not pass through the hole. The jack is held in place with a lock nut affixed to the rear end of the jack at a position flush with the panel. Flexible locking ears on the locking nut frictionally engage the jack.

2 Claims, 7 Drawing Figures

PANEL MOUNTED MODULAR JACK

DESCRIPTION

1. Technical Field

This invention relates to a modular jack electrical connector. More specifically, it refers to a modular jack easily mounted and disassembled in a vertical or horizontal single piece panel.

2. Background Art

Modular jacks have found widespread acceptance in the telecommunications systems of the world because of their ease of connecting and disconnecting, low cost and reliable electrical connections. Different variations of modular jacks are described in detail in U.S. Pat. Nos. 3,850,497, 4,040,699, 3,699,498 and 4,224,485. U.S. Pat. No. 3,850,497, in particular, shows a jack mounted (FIGS. 5 and 6) between two sections of a vertical panel. This type of design is limited to vertical panels of specific thickness and requires two distinct sections of panel to be placed together. This type of design is cumbersome and inflexible.

SUMMARY OF THE INVENTION

We have discovered a new design for modular jack electrical connectors for mounting on a vertical or horizontal panel that does not have these prior art limitations. Our assembly merely requires that a hole be punched in a panel large enough to accommodate the rear end of our jack housing. The hole must be sufficiently limited in diameter to prevent the front face of the jack or locking nut from passing through the panel opening. After the jack is inserted into the hole, a locking nut is placed over the rear end of the jack and is pushed flush up against the panel. Flexible locking ears on the locking nut frictionally engage the rear end of the jack to hold it in place.

BRIEF DESCRIPTION OF THE DRAWINGS

The present invention may be best understood by those of ordinary skill in the art by reference to the following detailed description when considered in conjunction with the accompanying drawings in which:

FIG. 6(*d*) is a partial cut away perspective view of the sticky tape that may be optionally employed in the embodiments of the invention.

DESCRIPTION OF THE PREFERRED EMBODIMENT

Figure 1:
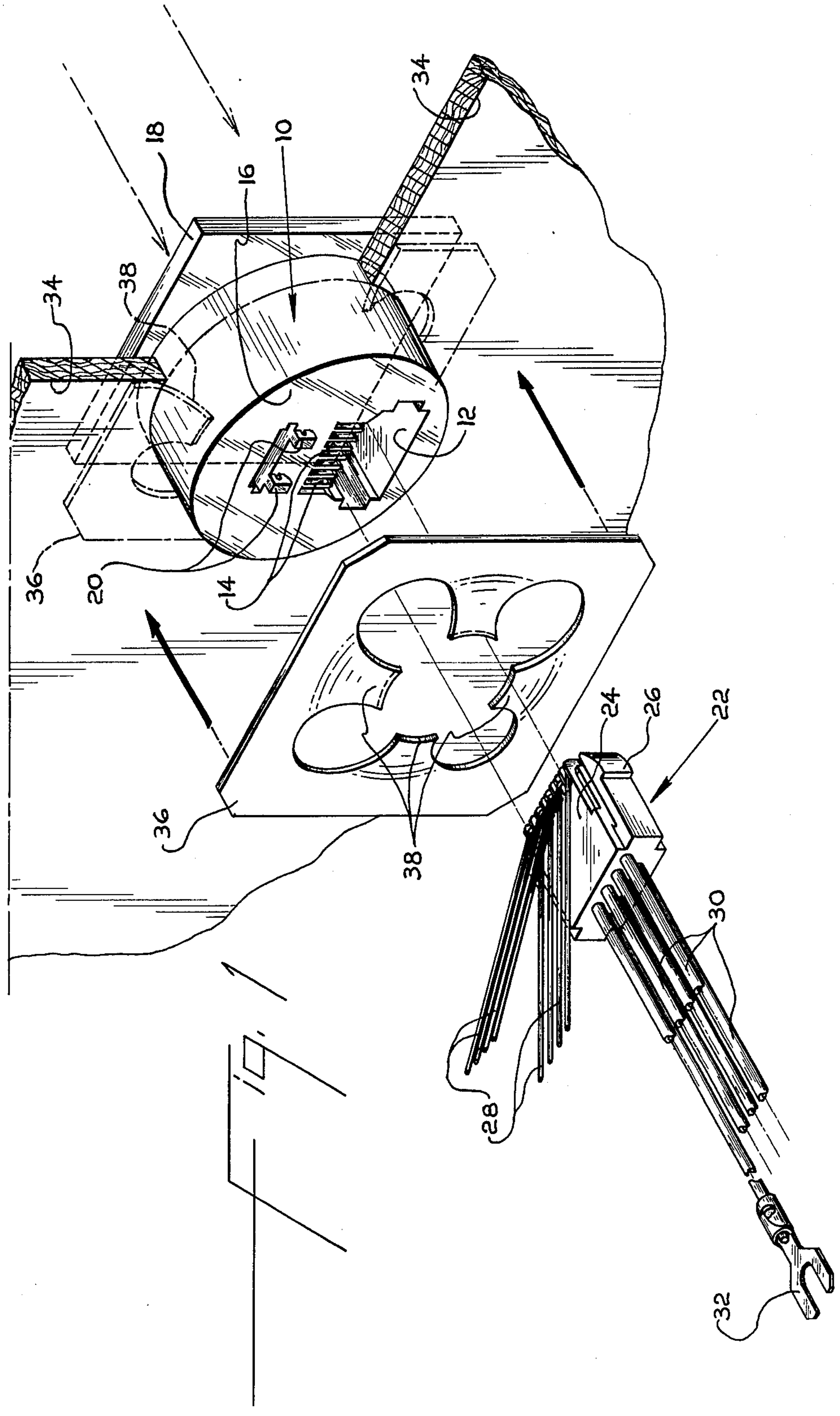
FIG. 1 is an exploded assembly view of one embodiment of the invention.

Referring first to FIG. 1 the jack housing 10 comprises a dielectric plastic such as ABS (acrylonitrile-butadiene-styrene) or other like material. The jack housing 10 contains a rear opening 12 having on its upper surface a series of combs 14. The rear end 16 of housing 10 is of smaller size than the face plate 18 of the jack 10. The jack housing 10 also has molded on it a feature for accepting a shorting bar 20. The jack insert 22 comprises a housing 24 with exterior latches 26 and stripped contact wires 28 running through the center of the jack insert and coming from insulated wire 30 which is also connected on one end to a spade contact 32. The jack insert 22 is inserted into the rear opening 12 of the jack housing. Each contact wire 28 fits within a pair of teeth in the comb 14.

The jack 10 is used for mounting on a vertical or horizontal panel 34 by first punching a hole in the panel sufficiently large to accommodate the rear end 16 of the jack housing but small enough so that the face plate 18 of the jack housing 10 cannot pass through the hole. After the rear end 16 of the jack housing 10 is placed in the hole, a lock nut 36 made of steel, brass or phosphor bronze is placed over the rear end 16 of the jack housing 10. This lock nut 36 has at least two locking ears 38 which frictionally engage the rear end 16 of the jack housing. By pressing the lock nut 36 up to a point flush with the panel 34, the locking ears 38 hold the jack housing 10 in place within the hole of the panel 34.

Figure 2:
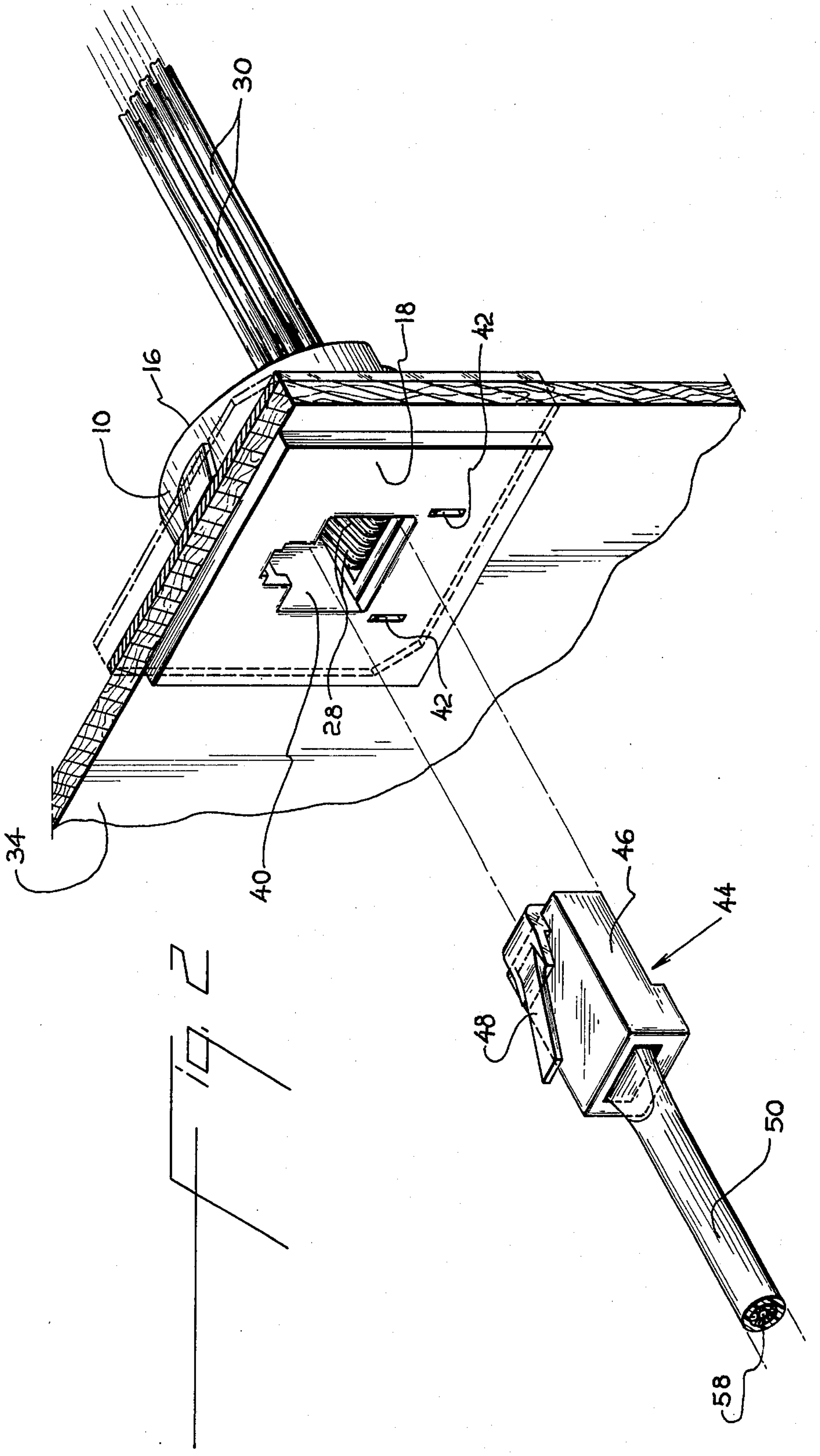
FIG. 2 is a front perspective view of the jack mounted on a panel with the plug about to be inserted.

FIG. 2 shows the front of the jack housing 10 and in particular the face plate 18. The plug opening 40 is visible with the contact wires 28 ready for connection with the corresponding wires 58 in the plug 44. Plug 44 has a housing 46, a latch 48 and an insulated cord 50 containing multiple insulated conductors 58. Molding slots 42 are used for making cavity 12 accommodating jack insert 22.

Figure 3:
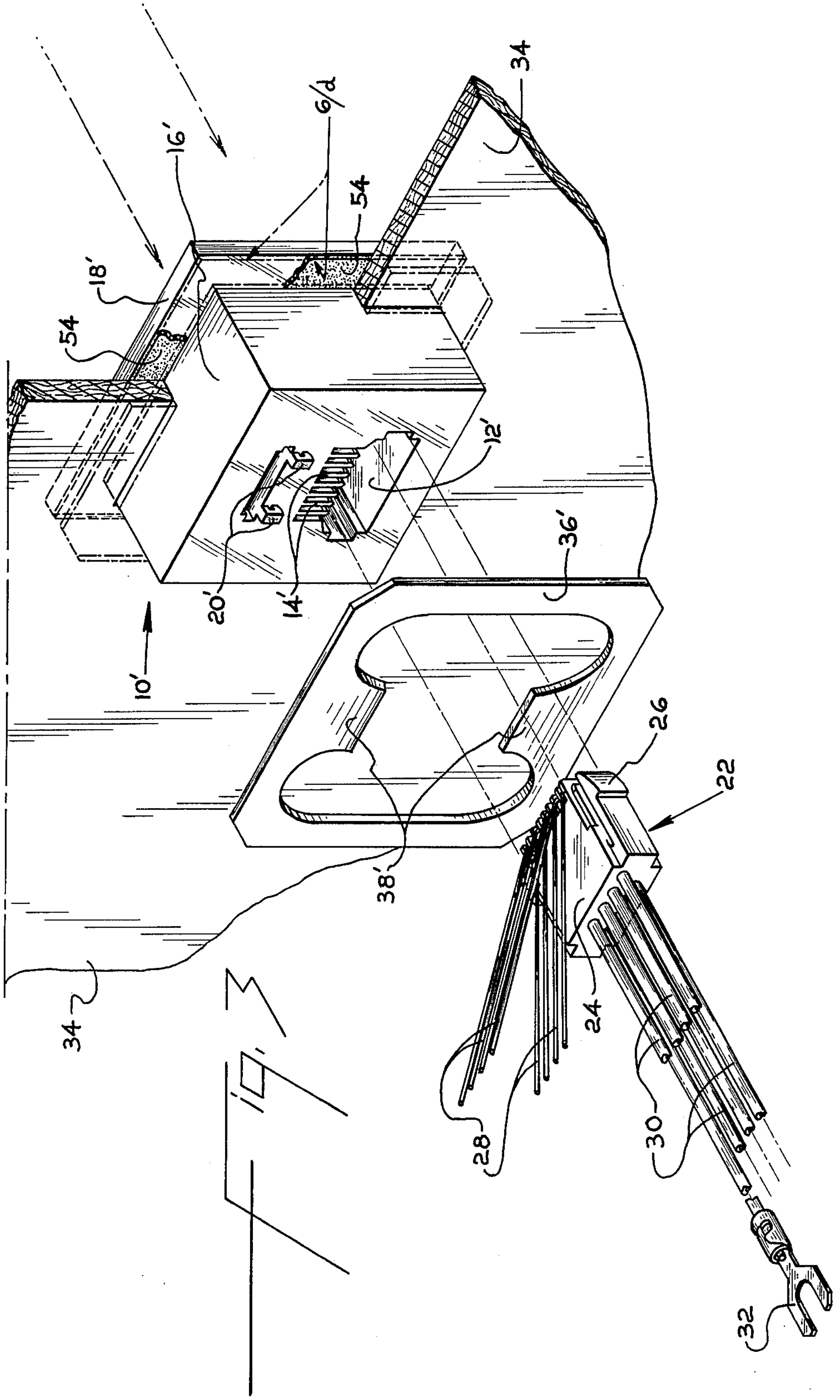
FIG. 3 is an exploded assembly view of another embodiment of the invention.

FIG. 3 shows an alternate embodiment of the invention. In this particular embodiment the jack housing 10' has a square shape. The rear end 16' exhibits this shape. Aside from this difference in shape the insert opening 12', the shorting bar holder 20' and the combs 14' are the same as in the previous embodiment. The jack housing 16' is mounted within a square hole punched in the panel 34. The hole is large enough to accommodate the rear end 16' but is not large enough to allow the face plate 18' from moving through this opening. An optional two-sided sticky tape 54 may be mounted on the rearward end of the face plate 18'. This provides a more secure mounting on the panel when used with lock nut 36'. The sticky tape 54 could also be used without lock nut 36'.

Figure 4:
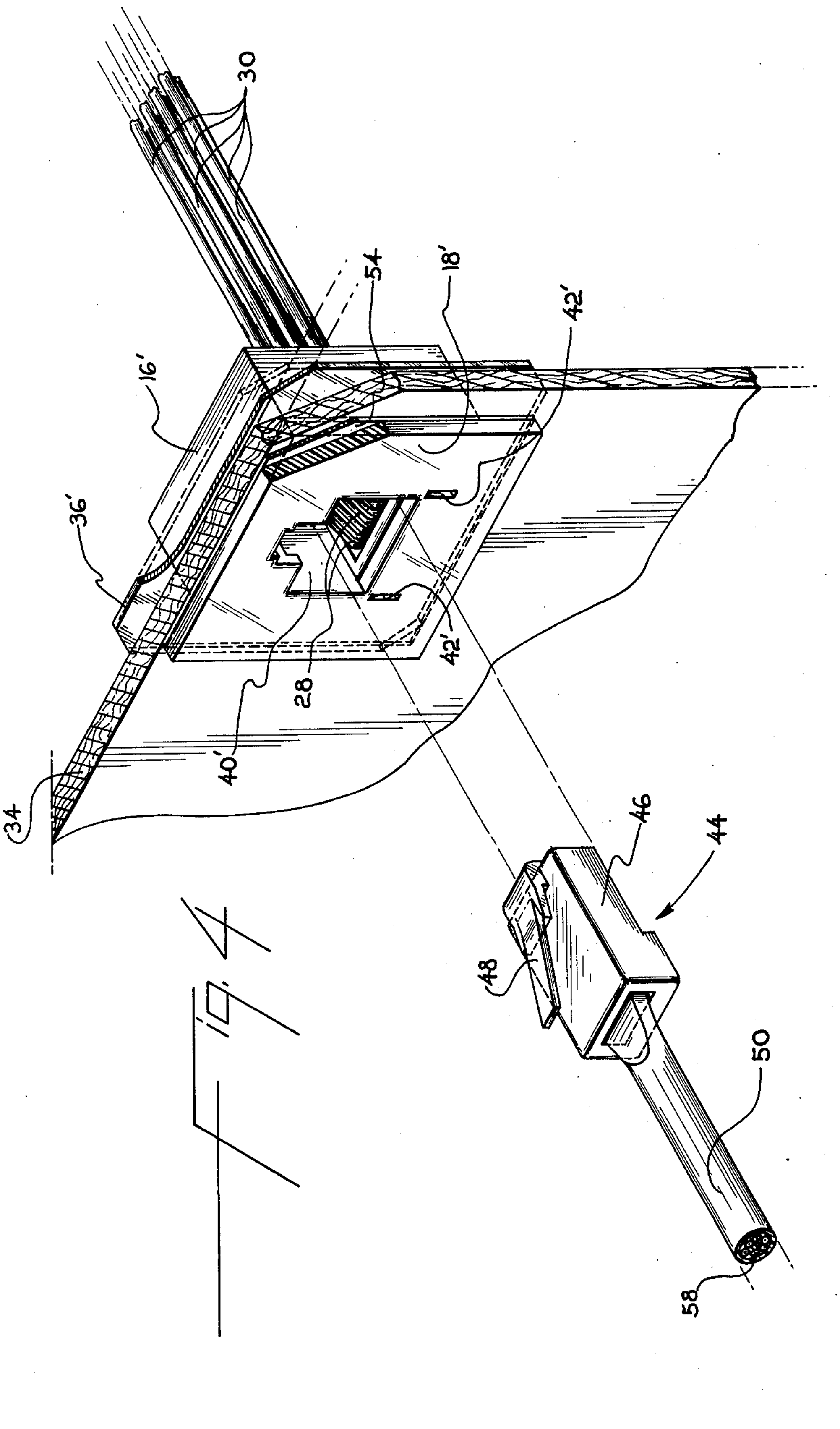
FIG. 4 is a front perspective view of the embodiment of the invention shown in FIG. 3.

FIG. 4 shows the front plate 18' having an opening 40' with the contact wires 28 and the molding slots 42' clearly visible. In this view another double-sided sticky tape 54 is added between the front plate 18' and the panel 34 to more securely mount the jack on the panel. For additional stability it is recommended that a lock nut be inserted on the jack in the panel 34.

Figure 5:
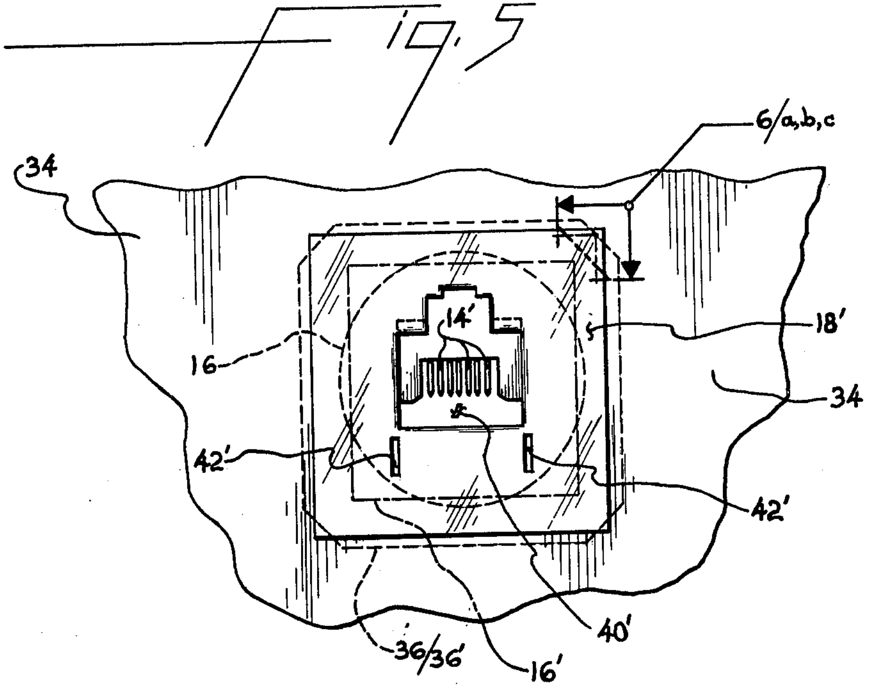
FIG. 5 is a front elevation view of the jack housing of either FIG. 1 or 3 mounted on a vertical panel.
Figure 6:
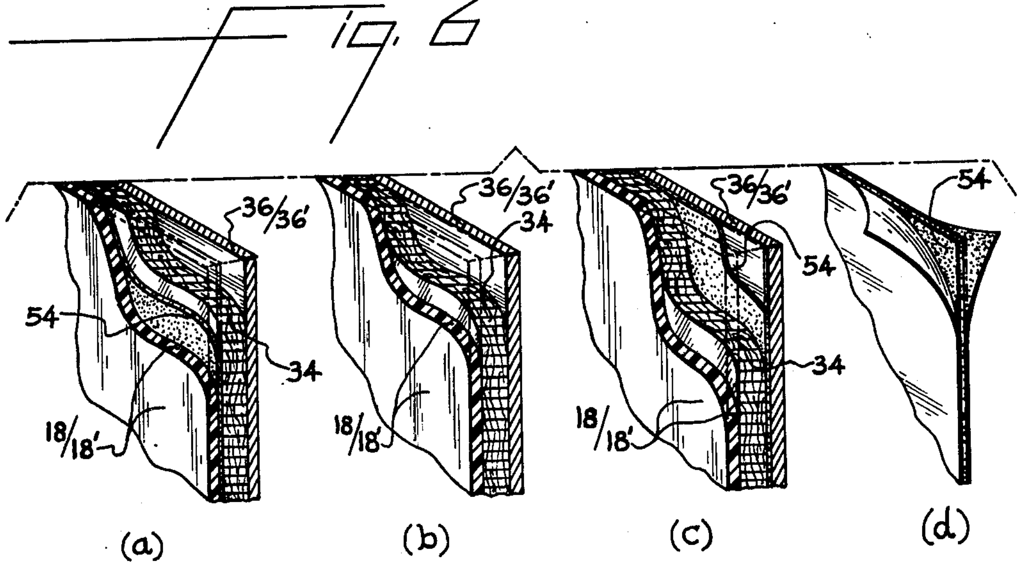
FIGS. 6(*a*)-(*c*) are cross sections of various embodiments of the jack assembly mounted on a panel.

FIGS. 5 and 6 show all the embodiments of the invention with the various configurations with and without double-sided sticky tape. FIG. 6(*a*) shows the embodiment as in FIGS. 3 and 4 where the face plate 18' has a tape 54 between it and the panel 34. There is no tape in FIG. 6(*b*) between the panel 34 and the lock nut 36. There is merely a face plate 18, panel 34 and a lock nut 36. In 6(*c*) the tape 52 is located between the lock nut 36' and the panel 34. This arrangement is useful when it is necessary to maintain the orientation of the jack used in a round hole without placing tape on the face plate back surface. There is no tape in this instance between the face plate 18' and the panel 34. FIG. 6(*d*) shows the tape as it comes in commercial form with a protective shield on each side.

Figure 7:
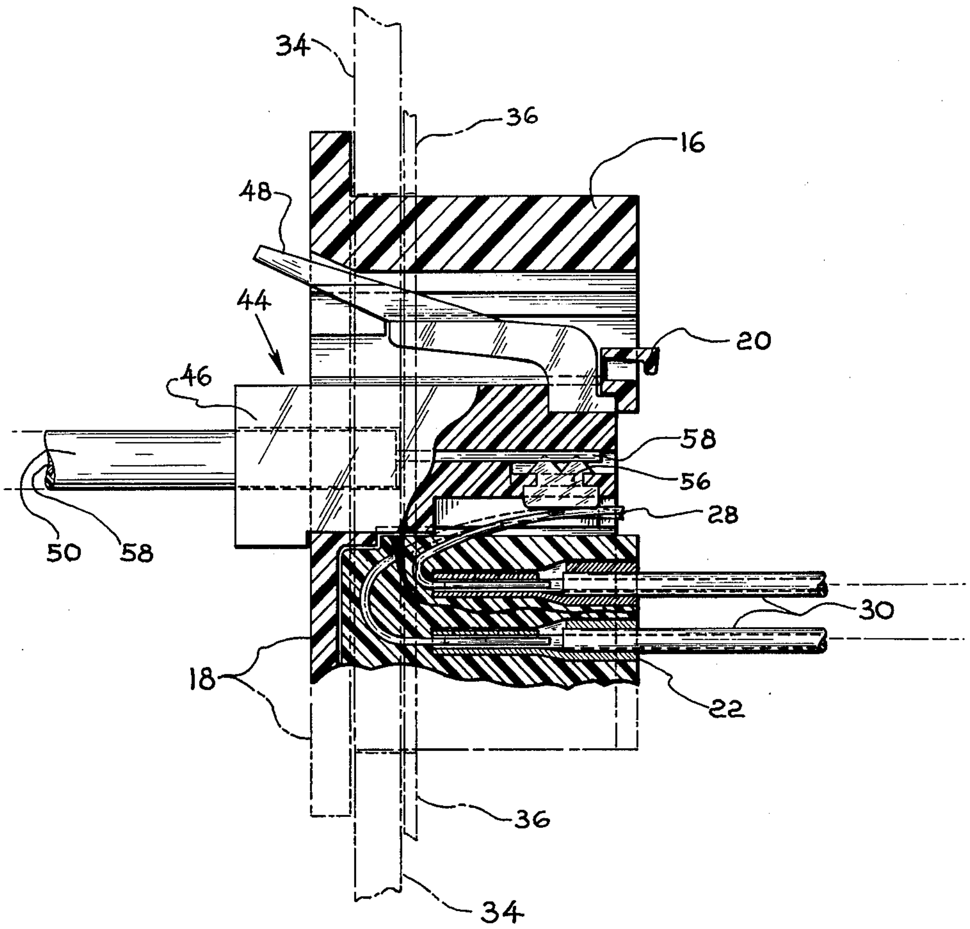
FIG. 7 is a cross section of the engaged jack and plug assembly mounted on a vertical panel.

FIG. 7 shows the invention in cross section with the plug 44 and insert 22 mounted in the jack housing 10 which, in turn, is mounted on the panel 34. This cross section shows the wire 58 of the plug 44 being pierced by the plug contact 56. This plug contact is in electrical engagement with the contact wire 28 from the insert so as to complete the circuit in the connector assembly.

Having thus described the invention what is claimed and desired to be secured by Letters Patent is:

1. In an electrical assembly having a jack and complementary plug mounted on a vertical or horizontal panel, with the jack having a front face of larger size than a rear end, in a hole in the panel sufficiently large to accept the rear end of the jack but insufficiently large to allow the front face of the jack to pass through the hole, the improvement comprising having mounted on the rear end of the jack a lock nut of a flexible metal with an opening sufficiently large to accommodate the rear end of the jack and at least two flexible locking ears protruding into said opening to provide a friction contact with the rear end of the jack and a two-sided sticky tape inserted between the panel and a rear portion of the jack front face.

2. In an electrical assembly having a jack and complementary plug mounted on a vertical or horizontal panel, with the jack having a front face of larger size than a rear end, in a hole in the panel sufficiently large to accept the rear end of the jack but insufficiently large to allow the front face of the jack to pass through the hole, the improvement comprising having mounted on the rear end of the jack a lock nut of a flexible metal with an opening sufficiently large to accomodate the rear end of the jack and at least two flexible locking ears protruding into said opening to provide a friction contact with the rear end of the jack and a two-sided sticky tape inserted between the lock nut and the panel.

* * * * *